United States Patent Office 3,679,655
Patented July 25, 1972

3,679,655
N,N-DISUBSTITUTED AMINOETHYLCARBAMYL PROTECTING GROUPS FOR CYSTEINE
Georg Jager, Raunheim (Main), and Rolf Geiger, Frankfurt am Main, Germany, assignors to Farbwerke Hoechst Aktiengesellschaft vormals Meister Lucius & Bruning, Frankfurt am Main, Germany
No Drawing. Filed June 20, 1969, Ser. No. 835,259
Claims priority, application Germany, June 28, 1968, P 17 68 777.3; July 31, 1968, P 17 93 089.1; June 14, 1969, P 19 30 330.1
Int. Cl. C07c *101/00, 103/52, 155/08*
U.S. Cl. 260—112.5                      2 Claims

ABSTRACT OF THE DISCLOSURE

A method of protecting the sulfur atom of cysteine in peptide synthesis by reaction with β-[N,N-disubstituted]-aminoethyl isocyanate in which one substituent is methyl or ethyl and the other is benzyloxycarbonyl, t-butyloxycarbonyl, or adamantyloxycarbonyl. For removal of the protective group, the peptide is treated with a strong acid to form the acid salt of the corresponding monosubstituted N-ethyl or N-methyl amino compound and then made alkaline to liberate the amine. The protective group cleaves intramolecularly with formation of a methyl or ethyl-substituted imidazolone and the peptide in which the cysteine sulfur atom is present as sulfhydryl.

---

The present invention provides cysteine-containing peptides and a process for preparing them, wherein a peptide comprising at least one protected cysteine unit of the general Formula I

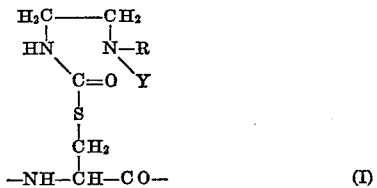

(I)

wherein R represents the methyl or ethyl group and Y represents the benzyloxycarbonyl group, the tertiary butyloxycarbonyl group or the adamantyloxycarbonyl group, is treated with strong acids, and the salt of the secondary amine of the general Formula II

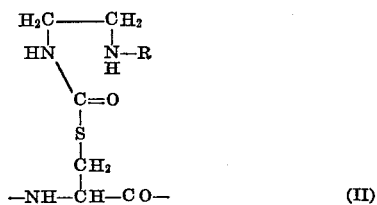

(II)

thus formed is converted into the free amine by addition of a base and, if required, subsequent heating.

In the reaction of the amine, the protective group is split off with the intramolecular formation of a cyclic urea of the general Formula III

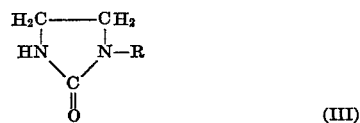

(III)

and the free SH-group of the cysteine-containing peptide

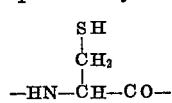

is formed.

In the synthesis of cysteine-containing peptides, the sulfhydryl group of the cysteine is occasionally protected by the benzoyl or acetyl group (J. Amer. Chem. Soc., volume 85 (1963), page 1337; Experientia, volume 20 (1964), page 487), or also by the ethylcarbamoyl group (Helv. Chim. Acta, volume 49 (1966) page 83). These groups allow a differentiation from the frequently used aralkyl protective groups. The two first indicated S-acyl-protective groups have the disadvantage of easily undergoing a S→N-acyl-migration which does not occur, under normal conditions, in the ethylcarbamoyl group, whose reactivity to nucleophilic agents, however, is so strongly reduced that the splitting off by such reagents may encounter some difficulties in higher peptides.

The SH-protective groups of the present invention do not show the above-mentioned disadvantages because they do not undergo a S→N-acyl migration and their intramolecular splitting off in higher peptides proceeds at the same speed as in lower peptides. Consequently, the use of an excess of basic splitting reagent is no longer necessary. Moreover, protective groups which may be removed by acidolysis may previously be split off selectively, since, after removal of the Y group, the SH-group is still blocked and resistant to acids.

The cysteine derivatives necessary for the preparation of the cysteine-containing peptides of the invention are prepared by the reaction of cysteine-hydrochloride with β-[N-benzyloxycarbonyl-N-methyl- (or ethyl)]-aminoethylisocyanate or with the corresponding N-tertiary butyloxycarbonyl or N-adamantyloxycarbonyl compounds.

These compounds can be used, according to the general methods of peptide chemistry for the preparation of cysteine-containing peptides. Thus, for example S-[β-(N-benzyloxycarbonyl - N - methyl)-aminoethylcarbamoyl]-cysteine can be converted into the corresponding 2-nitrophenylsulfenyl-compound, which may be reacted with amino acid esters or amides or peptide esters or amides with extension of the chain at the terminal carboxy groups of the cysteine to form peptides (with an increased chain length), for example with glycine nitrobenzyl ester to form N - [2 - nitrophenylsulfenyl]-S-[β-(N-benzyloxycarbonyl - N - methyl)-aminoethylcarbamoyl]-cysteinyl-glycine-4-nitrobenzyl ester. By splitting off the nitrophenylsulfenyl group by means of methanolic hydrochloric acid, the S-protected dipeptide ester-hydrochloride is formed which can be reacted with N-acylamino acids or peptides to form new peptides with increased chain length at the terminal amino group of the cysteine.

For the synthesis of the S-protected cysteine-containing peptides, the usual condensation methods known in peptide chemistry are applied, for example, the mixed anhydride method, the carbodiimide method or the peptide synthesis by way of active esters.

As further units of the peptides containing the cysteine derivatives of the general Formula I, all amino acids in the L- or D-form found in naturally occuring peptides may be used. It is also possible to use β-amino acids, for example, β-alanine or other amino acids which are accessible only by synthesis or partial synthesis, for example, α-methylalanine, α-methyl-3,4-dihydroxy-L-phenylalanine or β-chloroalanine. Further functional groups of the amino acids are suitably protected according to the methods generally applied in peptide chemistry. (cf. E. Schröder and K. Lübke, "The Peptides," New York and London 1965, volume I, especially pages 3–75).

According to the process of the invention, the new S-protective groups can be split off by removing first the group Y by means of strong acids, for example, HBr in glacial acetic acid. If Y represents the tertiary butoxycarbonyl group or the adamantyloxycarbonyl group, the protective groups may be split off with trifluoroacetic acid in the cold. In a second step, the amine is set free free from the formed salt, for example, from the hydrobromide of the secondary amine, by adding a base. The free amine, which is a nucleophilic agent, is allowed to react intra-molecularly at room temperature or by heating for example to 40–60° C., preferably to 50° C. With heating, the splitting off is complete within 1 to 4 hours, whereas at room temperature, it is advantageous to allow the free amine to stand for 24 hours or longer. Temperatures of more than 60° C. are possible, but side reactions may occur at other points of the molecule.

As bases, there may be used, for example NaOH, LiOH, alkali metal alcoholates such as sodium methoxide, ammonia or amines. Tertiary amines are preferred, for example triethyl-or tripropylamine, N-methylmorpholine or dimethylcyclohexylamine. In this case the pH value of the reaction solution may be below 7.

As solvents for the intra-molecular reactions, all solvents which are generally employed in peptide chemistry may be used, provided they dissolve sufficiently the peptides to be split and do not undergo any alteration under the reaction conditions, for example dioxane, alcohols and dimethylacetamide or mixtures thereof.

The peptides obtained upon splitting off of the protective groups are isolated by methods generally applied in peptide chemistry, the cysteine-containing peptides formed first being converted into the corresponding cystine-containing peptides generally by oxidation, for example, with atmospheric oxygen or iodine.

The compounds of the present invention can be used as therapeutics or may be used as intermediates for the manufacture of other therapeutically valuable peptides, for example, desamino-oxytocin or insulin.

The following examples serve to illustrate the present invention but they are not intended to limit it thereto. For the individual amino acids and protective groups, the abbreviations common in peptide chemistry are used.

Z—benzyloxycarbonyl
Boc—tertiary butyloxycarbonyl
Adoc—adamantyloxycarbonyl
tBu—tertiary butyl
Bz—benzoyl
Nps—2-nitrophenylsulfenyl
ONb—4-nitrobenzyl
OSu—N hydroxysuccinimide
DHCA—dicyclohexylamine For the β-(N-benzyloxycarbonyl-N-methyl)-aminoethylcarbamoyl group, serving as an example for the new S-protective groups, the abbreviation Z-Mac will be used, the β-(N-tert.-butyloxycarbonyl-N-methyl)-aminoethylcarbamoyl group is designated by the abbreviation Boc-Mac, and the β-(N-adamantyloxycarbonyl-N-methyl)-aminoethylcarbamoyl group by the abbreviation Adoc-Mac.

EXAMPLE 1

(a) N-methyl-β-alanine 185 g. (0.59 mol) of Ba (OH)$_2$·8 H$_2$O were heated on a steam bath. As soon as the barium hydroxide had dissolved in its crystal water, 84.1 g. (1.0 mol) of N-methylaminopropionitrile (prepared according to J. Chem. Soc., vol. 1 945, page 399) were added dropwise, while stirring, with in 40 minutes. The temperature was kept at 90–95° and the reaction was allowed to continue at this temperature for 40 minutes. Then, 1 l. of hot water was added and the mixture was saturated with CO$_2$ for 20–30 minutes at 85–90°. The precipitated BaCO$_3$ was separated by filtration with suction and the filter residue was washed with 0.5 l. of hot water having a temperature of 90° C. The combined filtrates were evaporated in vacuo until a solid product separated; this product was dissolved in 250 cc. of ethanol, slowly precipitated with ether, suction-filtered and dried in vacuo over P$_2$O$_5$. The yield was 91.2 g. (88% of the theory); melting point 149–151°.

C$_4$H$_9$NO$_2$ (molecular weight: 103.1).—Calculated (percent): C, 46.59; H, 8.80; N, 13.58. Found (percent): C, 46.3; H, 8.8; N, 13.8.

(b) N-benzyloxycarbonyl-N-methyl-β-alanine 103 g. (1.0 mol) of N-methyl-β-alanine were dissolved in 500 cc. of 2 N NaOH and, within 30 minutes, 188 g. (1.1 mols) of carbobenzoxy chloride and 500 cc. of 2 N NaOH were added dropwise at the same time, while stirring and cooling with ice. After 10 minutes of stirring, the aqueous phase was extracted by shaking with ether, cooled and acidified with semi-concentrated HCl. The precipitated oil was taken up in ether, the solution was washed with water, dried over Na$_2$SO$_4$ and evaporated in vacuo. The yield was 221 g. (93% of the theory). The oil obtained crystallized upon standing. For analysis, a sample was triturated with ligroin, suction-filtered and dried over P$_2$O$_5$ in vacuo. Melting point 54.5–55.5°.

C$_{12}$H$_{15}$NO$_4$ (molecular weight: 237.3).—Calculated (percent): C, 60.74; H, 6.37; N, 5.90. Found (percent): C, 60.8; H, 6.4; N, 5.8.

(c) β-(N-benzyloxycarbonyl-N-methyl)-aminoethyl isocyanate 214 g. (0.90 mol) of N-benzyloxycarbonyl-N-methyl-β-alanine were dissolved in 1.35 l. of acetone and 104.5 g. (1.03 mols) of triethylamine in 370 cc. of acetone and then 122 g. (1.12 mols) of chloroformic acid ethyl ester in 370 cc. of acetone were slowly added dropwise while stirring, at 0°. After stirring for 30 minutes, 84.25 g. (1.3 mols) of sodium azide in 270 cc. of water were added dropwise at 0° and the whole was stirred for 1 hour. The reaction mixture was then poured into 2.5 l. of ice-water and the acid azide was extracted three times with ice-cold toluene. The toluene-solution was dried first over MgSO$_4$ and then over P$_2$O$_5$ in the cold. The above mentioned toluene solution was slowly introduced dropwise in a round-bottomed flask provided with reflux condenser and dropping funnel, in a steam bath, which was accompanied by violent evolution of nitrogen. When the dropwise addition was finished, the whole was heated for one more hour and the solvent was removed in vacuo. The yield was 182 g. (86% of the theory). The oil could be distilled in a high vacuum; boiling point 120° C./0.02 mm. Hg. The isocyanate, however, could be used without previous distillation.

C$_{12}$H$_{14}$N$_2$O$_3$ (molecular weight: 234.3): Calculated (percent): C, 61.52; H, 6.02; N, 11.96. Found (percent): C, 61.6; H, 5.9; N, 12.0.

(d) H-Cys (Z-Mac)-OH 15.85 g. (100 mmols) of H-Cys-OH·HCl were dissolved in 140 cc. of dimethylformamide and to the solution were added, at —5°, 25.8 g. (110 mmols) of β-(N-benzyloxycarbonyl - N - methyl)-aminoethyl isocyanate. After the solution stood for 36 hours in the closed flask at room temperature, it was evaporated in a high vacuum at a temperature below 30° C. The syrupy residue was digested three times with absolute ether and then dissolved in water. The solution was washed with ether and adjusted to a pH of 6.5 by means of 1 N NaOH. The suspension obtained was allowed to stand for some hours in the refrigerator. The precipitate filtered off by suction was washed with water and dried over P$_2$O$_5$ in a high vacuum. The yield was 26.36 g. (74% of the theory). Melting point 158–160° C. (decomposition).

C$_{15}$H$_{21}$N$_3$O$_5$S (molecular weight: 355.4).—Calculated (percent): C, 50.69; H, 5.96; N, 11.82; S, 9.02. Found (percent): C, 50.7; H, 6.0; N, 12.0; S, 8.7.

(e) Nps-Cys (Z-Mac)-OH·DCHA 35.54 g. (100 mmols) of H-Cys (Z-Mac)-OH were suspended in 140 cc. of dioxane. At a pH of 7.3–7.5, 20.8 g. (110 mmols) of 2-nitrophenylsulfenyl chloride were added in small portions and simultaneously 105 cc. of 2 N NaOH were added dropwise, while stirring, within 1 hour. The solution obtained was diluted with 1 l. of water, filtered and adjusted to a pH of 2–3 by means of 1 N $H_2SO_4$. The oily product that had precipitated was taken up in ethyl acetate. The solution was washed with water and dried over sodium sulfate. The salt precipitated upon addition of 25 cc. of dicyclohexylamine. It was filtered off with suction, washed with ether/ petroleum ether and dried in vacuo. The crude product was suspended in dry methanol. This suspension was allowed to stand for ½ hour and then mixed with absolute ether. The yield was 41.5 g. (60% of the theory); melting point 152° C. After recrystallization from methanol/ ether, the salt had a melting point of 160° C.

$C_{33}H_{47}N_5O_7S_2$ (molecular weight: 689.9).—Calculated (percent): C, 57.45; H, 6.87; N, 10.15; S, 9.30. Found (percent): C, 57.6; H, 7.1; N, 10.2; S, 9.4.

(f) Nps-Cys (Z-Mac)-Gly-ONb 18.0 g. (26.1 mmols) of Nps-Cys (Z-Mac)-OH·DCHA were suspended in 210 cc. of dimethylformamide and 2.49 cc. (26.1 mmols) of chloroformic acid ethyl ester were added dropwise, while stirring vigorously, at a temperature of −15°. After stirring for 20 minutes, 7.6 g. (26.1 mmols) of H-Gly-ONb·HBr were added in one portion and then 3.62 cc. (26.1 mmols) of triethylamine in 21 cc. of dimethylformamide were added. After stirring for three hours at room temperature, the mixture was diluted with water, the product that had precipitated was taken up in ethyl acetate and the solution was washed as usual with water, 0.2 N $H_2SO_4$ and a solution of 1 $NaHCO_3$, dried over $Na_2SO_4$ and evaporated in vacuo. The oily residue was sharply dried over $P_2O_5$ in a high vacuum. The yield was 16.35 g. (89% of the theory) of chromatographically uniform varnish. After recrystallization from ethyl acetate/petroleum ether the product had a melting point of 117–118° C.

$C_{30}H_{32}N_6O_{10}S_2$ (molecular weight: 700.7).—Calculated (percent): C, 51.42; H, 4.60; N, 12.00; S, 9.15. Found (percent): C, 51.1; H, 4.6; N, 12.0; S, 9.3.

(g) H-Cys (Z-Mac)-Gly-ONb·HCl 16.35 g. (23.4 mmols) of Nps-Cys (Z-Mac)-Gly-ONb were dissolved in 190 cc. of 0.75 N methanolic hydrochloric acid and allowed to react for 10 minutes at room temperature. Then the solution was filtered through glass wool and poured into 1.5 l. of absolute ether. After standing for 2 hours in the refrigerator and occasional triturating, the precipitate was filtered off with suction and washed with absolute ether. The yield was 10.9 g. (80% of the theory); melting point: 169.5° (Decomposition).

$C_{24}H_{30}N_5O_8SCl$ (molecular weight: 584.0).—Calculated (percent): C, 49.36; H, 5.18; N, 12.00; S, 5.49; Cl, 6.09. Found (percent): C, 49.1, H, 5.4; N, 12.1; S, 5.7; Cl, 6.3.

(h) Bz-Val-Cys (Z-Mac)-Gly-ONb

The starting substance Bz-Val-OSu was prepared from equivalent amounts of Bz-Val-OH, N-hydroxysuccinimide and dicyclohexylcarbodiimide in dioxane. The yield was 69%; melting point: 149–151° C. After recrystallization from isopropanol the substance had a melting point of 174° C. The yield was 50%.

$C_{16}H_{18}N_2O_5$ (molecular weight: 318.3).—calculated (percent): C, 60.37; H, 5.70; N, 8.80. Found (percent): C, 60.4; H, 5.7; N, 8.8.

The solution of 7.95 g. (13.6 mmols) of H-Cys (Z-Mac)-Gly-ONb·HCl and 4.35 g. (13.6 mmols) of Bz-Val-OSu in 68 cc. of dimethylformamide was combined with 1.88 cc. (13.6 mmols) of triethylamine at a temperature of −5° and allowed to stand for 2 hours at room temperature. After evaporation to dryness in vacuo, the residue was distributed between water and ethyl acetate and the ethyl acetate phase was washed, as usual, with water, 1 N HCl and a solution of 1 N $NaHCO_3$, dried over $Na_2SO_4$, slightly concentrated in vacuo and absolute ether was added. The precipitate obtained was filtered off with suction and washed with ether. The yield was 8.15 g. (80% of the theory). The product was triturated in ethyl acetate. Then ether was added to the suspension and filtered off with suction. The yield was 7.54 g. (74% of the theory); melting point 132–136° C. (not sharp); sintering began at 124°.

$C_{36}H_{42}N_6O_{10}S$ (molecular weight: 750.85).—Calculated (percent): C, 57.59; H, 5.64; N, 11.19; S, 4.27. Found (percent): C, 57.7; H, 5.5; N, 11.2; S, 4.5.

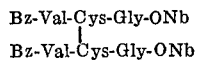
Bz-Val-Cys-Gly-ONb
|
Bz-Val-Cys-Gly-ONb 0.56 g. (0.75 mmol) of Ez-Val-Cys (Z-Mac)-Gly-ONb were allowed to react with 1 cc. of HBr/glacial acetic acid for 1 hour at room temperature. The solution obtained was then mixed with 50 cc. of absolute ether and whereupon the hydrobromide precipitated. Then the ether was decanted. The residue was combined with 50 cc. of absolute ether, triturated. The ether was again decanted. This operation was carried out twice. Finally, the crystals obtained were once more treated with absolute ether, filtered with suction and dried immediately for 30 minutes over $P_2O_5$ and KOH in a high vacuum. Subsequently, the hydrobromide (0.61 g.) was dissolved in 10 cc. of dimethylacetamide, 0.28 cc. (2 mmols) of triethylamine were added and the solution was heated in a closed flask for 3 hours to a temperature of 50° C. The reaction solution had a pH-value of approximately 5. After cooling to room temperature, 3 cc. of glacial acetic acid were added, the solution was then titrated with 0.1 N iodine solution (about 0.6 cc. were necessary), and finally, 50 cc. of water were added. The suspension obtained was allowed to stand in an open flask at room temperature for 2½ hours. After suction-filtering, the cystine-peptide was washed with water and ether and evaporated to dryness over $P_2O_5$ in a high vacuum. The yield was 0.31 g. (80% of the theory); melting point 188–190°. After boiling with methanol and sharp drying, the substance had a melting point of 218–220°; Yield 0.25 g. (65% of the theory).

$C_{48}H_{54}N_8O_{14}S_2$ (molecular weight: 1031.15).—Calculated (percent): C, 55.91; H, 5.28; N, 10.87; S, 6.22. Found (percent): C, 55.6; H, 5.2; N, 11.1; S, 6.2.

EXAMPLE 2

(a) Adoc-OSu 8.2 cc. (100 mmols) of pyridine in 65 cc. of dioxane were added dropwise, at 0°, while stirring to a solution of 21.5 g. (100 mmols) of 1-adamantyloxycarbonyl chloride (J. Amer. Chem. Soc., vol. 88 (1966) page 1988), and 15.0 g. (130) mmols) of N-hydroxysuccinimide in 100 cc. of dioxane. Stirring was continued for 20 hours at room temperature, the solution was filtered, washed with a little dioxane and the filtrate was evaporated in vacuo. The residue was dissolved in hot methanol and the product was allowed to crystallize while cooling. The crystals were boiled with absolute ether. Yield 1: 15.48 g.

The methanolic mother liquor was evaporated in vacuo, the oil was caused to crystallize in a mixture of methanol and water, the crystals were filtered off with suction and boiled twice with absolute ether. Yield 2: 4.11 g. Total yield: 19.59 g. (67%), melting point 140–141° C.

$C_{15}H_{19}NO_5$ (molecular weight 293.3).—Calculated (percent): C, 61.42; H, 6.53; N, 4.78. Found (percent): C, 61.1; H, 6.4; N, 5.0.

(b) Adoc-Cys(Z-Mac)-OH 7.10 g. (20 mmols) of H-Cys(Z-Mac)-OH and 6.45 g. (22 mmols) of Adoc-OSu in 100 cc. of dimethylformamide were combined, at 0° C., with 2.8 cc. (20 mmols) of triethylamine. After stirring for 20 hours at room temperature, the mixture was filtered and the filtrate was evaporated in a high vacuum. The syrupy residue was dissolved in ethyl acetate and the solution was washed with diluted citric acid, sodium-bicarbonate solution and water, dried over sodium sulfate and evaporated in vacuo. The product was reprecipitated from ether/petroleum ether an dried over $P_2O_5$ in a high vacuum. Yield: 19.87 g. (quantitative); melting point 65–70° C.; $[\alpha]_D^{22}$: —15.8° (c.=1 in methanol).

$C_{26}H_{35}N_3O_7S$ (molecular weight 533.7).—Calculated (percent): C, 58.52; H, 6.61; N, 7.87; S, 6.01. Found (percent): C, 58.6; H, 6.8; N, 7.9; S, 5.7.

(c) Adoc-Cys(Z-Mac)-Pro-Leu-Gly-$NH_2$ 12.82 g. (24 mmols) of Adoc-Cys-(Z-Mac)-OH and 3.56 g. (26.4 mmols) of 1-hydroxybenzotriazole in 40 cc. of dimethylformamide were combined, at 0° C., with 4.96 g. (24 mmols) of dicyclohexylcarbodiimide. The mixture was allowed to stand for 1 hour at 0° C. and for 1 hour at room temperature. Then, it was suction-filtered to remove the urea, washed with 20 cc. of dimethylformamide, and 5.86 g. (20 mmols) of H-Pro-Leu-Gly-$NH_2$·½$H_2O$ were introduced into the filtrate. After standing for 2 hours at room temperature, the mixture was filtered, washed with 40 cc. of dimethylformamide and the filtrate was evaporated in a high vacuum. The oily residue was distributed between ethyl acetate and water and the ethyl acetate phase was washed with dilute citric acid, sodium-bicarbonate solution and water, dried over sodium sulfate and evaporated in vacuo. The crude product was dissolved in a little methanol, introduced in a column filled with neutral aluminum oxide and eluted with methanol. After evaporation of the methanolic eluate, the product was dried over $P_2O_5$ in high vacuo. Yield: 15.81 g. (82%); melting point 114–116° C. after recrystallization from ethyl acetate/ether. $[\alpha]_D^{22}$: —56° (c.=1 in methanol).

$C_{39}H_{57}N_7O_9S$ (molecular weight 800.0).—Calculated (percent): C, 58.55; H, 7.18; N, 12.26; S, 4.01. Found (percent): C, 58.4; H, 7.4; N, 12.0; S, 4.1.

(d) Boc-AsN-Cys(Z-Mac)-Pro-Leu-Gly-$NH_2$ (I) 14.00 g. (17.5 mmols) of Adoc-Cys(Z-Mac)-Pro-Leu-Gly-$NH_2$ were dissolved in 35 cc. of trifluoroacetic acid. After standing for 1 hour at room temperature, the solution was concentrated in vacuo and the oily residue was triturated with 500 cc. of absolute ether. The crystals were filtered off with suction, triturated with fresh absolute ether again filtered off with suction, washed with absolute ether and dried over KOH and $P_2O_5$ in a high vacuum; 12.20 g. of H-Cys(Z-Mac)-Pro-Leu-Gly-$NH_2$-trifluoroacetate.

(II) The dried trifluoroacetate (12.20 g.) and 6.17 g. (17.5 mmols) of Boc-AsN-ONp were dissolved in 50 cc. of dimethylformamide and combined, at —5° C., with 2.45 cc. (17.5 mmols) of triethylamine. After standing for 22 hours at room temperature, the solution was evaporated in a high vacuum. The oily residue was triturated with 250 cc. of ethyl acetate. The crystals which were filtered off with suction were washed with ethyl acetate and dried in vacuo. The product was then triturated with little cold water, filtered off with suction, washed with water and, after sharp drying, again triturated with ethyl acetate, suction-filtered and dried over $P_2O_5$ in high vacuum. Yield: 10.81 g. (74%); melting point 179.5–180° C. (decomposition). $[\alpha]_D^{22}$: —59° (c.=1 in glacial acetic acid).

$C_{37}H_{57}N_9O_{11}S$ (molecular weight 836.0).—Calculated (percent): C, 53.16; H, 6.87; N, 15.08; S, 3.84. Found (percent): C, 52.9; H, 6.8; N, 15.2; S, 4.0.

(e) Boc-GlN-AsN-Cys(Z-Mac)-Pro-Leu-Gly-$NH_2$ (I) 9.73 g. (11.65 mmols) of Boc-AsN-Cys(Z-Mac)-Pro-Leu-Gly-$NH_2$ were dissolved in 25 cc. of trifluoroacetic acid. After standing for 1 hour at room temperature, the solution was concentrated in vacuo. The crystal that were obtained when the oil was triturated with 400 cc. of absolute ether were filtered off with suction, washed with absolute ether, again triturated with absolute ether, filtered off with suction, and dried over KOH and $P_2O_5$ in high vacuum. Yield 9.80 g. of H-AsN-Cys(Z-Mac)-Pro-Leu-Gly-$NH_2$-trifluoroacetate. $[\alpha]_D^{22}$: —47.4° (c.=1 in glacial acetic acid).

(II) The dried trifluoroacetate (9.80 g.) and 4.92 g. (13.5 mmols) of Boc-GlN-ONp were dissolved in 45 cc. of dimethylformamide. The solution was combined, at 0° C., with 1.63 cc. (11.65 mmols) of triethylamine and, after standing for 64 hours at room temperature, evaporated in high vacuum. The oily residue crystallized when triturated with ethyl acetate. The crystalline crude product was filtered off with suction, washed with ethyl acetate and after drying, triturated with 20 cc. of water, filtered off with suction, washed with water and dried over $P_2O_5$ in high vacuum. Yield: 10.11 g. (90%); melting point: 172.5–173° C. (decomposition). $[\alpha]_D^{22}$: —63.7° (c.=1 in glacial acetic acid).

$C_{42}H_{65}N_{11}O_{13}S$ (molecular weight 964.1).—Calculated (percent): C, 52.32; H, 6.80; N, 15.98; S, 3.32. Found (percent): C, 52.5; H, 7.1; N, 15.7; S, 3.5.

(f) Boc-Ile-GlN-AsN-Cys(Z-Mac)-Pro-Leu-Gly-$NH_2$ (I) 2.9 g. (3 mmols) of Boc-GlN-AsN-Cys(Z-Mac)-Pro-Leu-Gly-$NH_2$ were dissolved in 14 cc. trifluoroacetic acid. After 1 hour the solution was concentrated in vacuo and triturated with 200 cc. of absolute ether. The crystals that formed were filtered off with suction, washed with absolute ether, dried over KOH and $P_2O_5$ in a high vacuum and reprecipitated from absolute methanol/absolute ether. Yield: 2.79 g. of H-GlN-AsN-Cys(Z-Mac)-Pro-Leu-Gly-$NH_2$-trifluoroacetate.

(II) The dried trifluoroacetate (2.79 g.) and 1.14 g. (3.5 mmols) of Boc-Ile-OSu were dissolved in 14 cc. of dimethylformamide. The solution was combined, at 0° C., with 0.42 cc. (3 mmols) of triethylamine, and after standing for 3 hours at room temperature, with 100 cc. of absolute ether. After triturating, the crystals were filtered off with suction, washed with absolute ether, dried, triturated with water, filtered off with suction and finally, after drying, triturated with ethyl acetate, filtered off wih suction and dried over $P_2O_5$ in high vacuum. Yield: 2.15 g. (66%); melting point: 206–207° C. (decomposition). $[\alpha]_D^{22}$: —64.2° (c.=1 in glacial acetic acid).

$C_{48}H_{76}N_{12}O_{14}S·H_2O$ (molecular weight 1095.3).—Calculated (percent): C, 52.64; H, 7.00; N, 15.35; S, 2.93. Found (percent): C, 52.6; H, 7.2; N, 15.2; S, 3.0.

(g) S -(N - benzyloxycarbonyl - N - methyl - aminoethylcarbamoyl)-(3-mercaptopropionic acid) (S-(Z-Mac)-3-mercaptopropionic acid)

34.0 g. (0.32 mol) of 3-mercaptopropionic acid in 375 cc. of dimethylformamide were combined, at —5° C., with 82.5 g. (0.35 mol) of N-benzyloxycarbonyl-N-methyl-aminoethyl isocyanate. After standing for 16 hours at room temperature, the solution was evaporated in a high vacuum. The oily residue was reprecipitated several times from absolute ether/petroleum ether and dried in a high vacuum. Yield: 109 g. (quantitative) of oil.

(h) S - (N - benzyloxycarbonyl - N - methyl - aminoethylcarbamoyl)-(3 - mercaptopropionic acid) N - hydroxysuccinimide ester (S-(Z-Mac)-mercaptoprop-OSu 6.81 g. (20 mmols) of S-(Z-Mac)-3-mercaptopropionic acid and 2.54 g. (22 mmols) of N-hydroxysuccinimide were dissolved in 175 cc. of acetonitrile and combined, at —5° C., with 4.1 g. (20 mmols) of dicyclohexylcarbodiimide. After standing for 15 hours at 0° C. and for 2 hours at room temperature, the mixture was suction-filtered to remove the urea washed with ethyl acetate and the filtrate was evaporated in vacuo. The residue was triturated several times with absolute ether, whereupon crystallization slowly occurred. The crystals which were filtered off were washed with absolute ether and dried over $P_2O_5$ in a high vacuum. Yield: 6.1 g. (70%); melting point: 92–94° C.

$C_{19}H_{23}N_3O_7S$ (molecular weight 437.5).—Calculated (percent): C, 52.16; H, 5.30; N, 9.61; S, 7.33. Found (percent): C, 51.9; H, 5.3; N, 9.3; S, 7.0.

(i) S-(Z-Mac)-mercaptoprop-Tyr(tBu)-OH

A suspension of 1.59 g. (6.68 mmols) of H-Tyr(tBu)-OH and 2.93 g. (6.68 mmols) of S-(Z-Mac)-mercaptoprop-OSu in 27 cc. of dimethylformamide was combined, at 0° C., with 0.93 cc. (6.68 mmols) of triethylamine and subsequently agitated for 3½ hours at room temperature. The mixture was filtered off from the few non-dissolved parts and the filtrate was evaporated in a high vacuum. The residue was distributed between ethyl acetate and dilute citric acid, and the ethyl acetate phase was washed with water and extracted three times by shaking with concentrated sodium bicarbonate solution. The extract was washed with ethyl acetate and acidified with 2 N HCl (pH=2). The separated oil was taken up in ethyl acetate and the solution of ethyl acetate was washed with sodium chloride solution, dried over sodium sulfate and evaporated in vacuo. The foamy residue was dried over $P_2O_5$ in a high vacuum. Yield: 2.98 g. (82%); $[\alpha]_D^{22}$: +20.0° (c.=1 in glacial acetic acid).

$C_{28}H_{37}N_3O_7S$ (molecular weight 559.7).—Calculated (percent): C, 60.09; H, 6.66; N, 7.51; S, 5.73. Found (percent): C, 60.3; H, 6.7; N, 7.7; S, 5.8.

(j) S - (Z - Mac) - mercaptoprop-Tyr-(tBu)-Ile-GlN-AsN-Cys(Z-Mac)-Pro-Leu-Gly-$NH_2$ (I) A solution of 2.91 g. (2.66 mmols) of Boc-Ile-GlN-AsN-Sys-(Z-Mac)-Pro-Leu-Gly-$NH_2 \cdot H_2O$ in 10 cc. of trifluoroacetic acid was concentrated in vacuo after standing for 1 hour at room temperature. Crystallization occurred when the remaining oil was triturated with 100 cc. of absolute ether. After decanting, the residue was triturated with 100 cc. of fresh absolute ether and the crystals were filtered off with suction, washed with absolute ether and dried over KOH and $P_2O_5$ in a high vacuum: 2.76 g. of H-Ile-GlN-AsN-Cys(Z-Mac)-Pro - Leu - Gly - $NH_2$ - trifluoroacetate.

(II) A solution of 3.03 g. (5.4 mmols) of S-(Z-Mac)-mercaptoprop-Tyr(tBu)-OH and 0.81 g. (6.0 mmols) of 1-hydroxybenzotriazole in 12 cc. of dimethylformamide was combined, at 0° C., within 1.26 g. (5.4 mmols) of dicyclohexylcarbodiimide. After standing for 1 hour at 0° C. for 1 hour at room temperature, the solution was filtered off with suction to remove the urea and washed with 10 cc. of dimethylformamide. The 2.76 g. of trifluoroacetate obtained in (I) were dissolved in the filtrate and 0.37 cc. (2.66 mmols) of triethylamine were added to the solution at 0° C. After standing for 2½ hours at room temperature, the solution was filtered off to remove the urea that had precipitated subsequently. The product precipitated upon addition of 300 cc. of absolute ether. This product was suction-filtered after triturating, washed with ether and ethyl acetate, dried and subsequently triturated in water. After suction-filtering and washing with water, the crystalline substance was dried over $P_2O_5$ in high vacuum and finally triturated in absolute methanol, filtered off with suction, washed with absolute methanol and dried over $P_2O_5$ in high vacuum. Yield: 3.03 g. (75%); melting point 214–215° C. (decomposition) $[\alpha]_D^{22}$: 48.1° (c.=1 in glacial acetic acid).

$C_{71}H_{103}N_{15}O_{18}S_2$ (molecular weight 1518.9).—Calculated (percent): C, 56.14; H, 6.84; S, 4.22. Found (percent): C, 55.8; H, 6.8; S, 4.0.

(k) Desamino-oxytocin (I) 0.76 g. (0.50 mmols) of S-(Z-Mac)-mercaptopro-Tyr(tBu)-Ile-GlN-Asn-Cys(Z - Mac) - Pro-Leu-Gly-$NH_2$ were dissolved in 11 cc. of HBr/glacial acetic acid. After standing for 1 hour at room temperature, the solution was combined with 100 cc. of absolute ether, decanted after triturating and the precipitate was treated three times with 100 cc. portions of absolute ether. The dihydrobromide, which was still weakly hygroscopic, was suction-filtered, washed with absolute ether and dried over KOH and $P_2O_5$ in high vacuum. Yield 0.81 g.

(II) A solution of 0.81 g. of di-(H-Mac)-desamino-oxytoceine 2 HBr in 10 cc. of dimethylacetamide was combined, after rinsing of the flask with $N_2$, with 0.37 cc. (2.66 mmols) of triethylamine and the whole was heated to 50° C. in a closed flask for three hours. After cooling to room temperature, the solution was evaporated in a high vacuum, the solid residue was triturated with 50 cc. of absolute ether, filtered off with suction, washed with absolute ether and dried in a high vacuum over $P_2O_5$. The crude desamino-oxytocein ($R_F$=0.09 in butanol/glacial acetic acid/water in the proportion of 3:1:1; thin layer plate silica gel F of Messrs. E. Merck, Darmstadt) was dissolved in 600 cc. of diluted acetic acid, the solution was neutralized with 100 cc. of dilute ammonia solution and finally, according to the method given by du Vigneaud (J. Biol. Chemistry, vol. 237, p. 1563 (1961)), oxidized with 0.015 N potassium ferric cyanide solution and worked up. A total yield of 54000–110000 I.U. was obtained.

EXAMPLE 3

(a) N-tert.-butyloxycarbonyl-N-methyl-$\beta$-alanine

To a solution of 120 g. of Boc-hydrazide in 600 cc. of dioxane and 230 cc. of water there were added, at 0° C., while stirring, 181 cc. of 5 N HCl, in portions. A solution of 63.4 g. of sodium nitrite in 185 cc. of water was added dropwise under continuous cooling, and the whole was stirred for 15 minutes at room temperature. After addition of 72 g. (0.7 mol) of N-methyl-$\beta$-alanine in 420 cc. of dioxane and 280 cc. of water, stirring was continued for 5 minutes. Then 195 cc. of triethylamine were added and the whole was stirred for 24 hours at 50° C. After cooling, the liquid portion was filtered off with suction from the precipitate and the filtrate was concentrated. Then 1.2 l. of water were added to the residue, the mixture was extracted three times by shaking with ethyl acetate, and the aqeous phase, which had been cooled to 0° C., was adjusted to a pH value of 2 by means of citric acid solution. The aqueous solution was extracted 4 times with ice-cold ethyl acetate, the combined solutions of ethyl acetate were washed three times with ice water, dried over sodium sulfate and evaporated to dryness in vacuo. Yield: 98.8 g. (70% of the theory) melting point 64–65.5° C.

$C_9H_{17}NO_4$ (molecular weight 203.2).—Calculated (percent): C, 53.19; H, 8.43; N, 6.89. Found (percent): C, 53.1; H, 8.4; N, 6.8.

(b) $\beta$-(N-tert.-butyloxycarbonyl-N-methyl)-aminoethyl isocyanate 130 g. (0.64 mol) of N-tert.-butyloxycarbonyl-N-methyl-$\beta$-alanine were dissolved in 1 l. of acetone; to this solution first 77.6 g. of triethylamine in 250 cc. of acetone and then 90.4 g. of chloroformic acid ethyl ester in 250 cc. of acetone were added dropwise. The whole was stirred for 30 minutes at −5° C. Stirring was continued for 1 hour at −5° after dropwise addition of a solution of 62.8 g. of sodium azide in 200 cc. of water. The solution was then poured into 3 l. of ice water, extracted three times with 500 cc. portions of ice cold toluene, and the toluene was dried, while cooling, first over magnesium sulfate and then over phosphorus pentoxide. The filtered solution was dropped into a flask which was provided with a reflux condenser, and heated in an oil bath to 75° C. The solution was heated for another hour to 75° C., and the solvent was then distilled off in vacuo. Yield: 108.7 g. (85% of the theory) of oil, $C_9H_{16}N_2O_3$ (molecular weight 200.2).—Calculated (percent): C, 53.98; H, 8.05; N, 13.99. Found (percent): C, 54.0; H, 8.2; N, 14.2.

(c) H-Cys(Boc-Mac)-OH 75.8 g. (0.48 mol) of H-Cys-OH·HCl were dissolved in 700 cc. of dimethylformamide and to the solution were added, at —5° C., 108 g. (0.54 mol) of β-(N-tert.-butyloxycarbonyl-N-methyl) - aminoethyl isocyanate. After standing for 24 hours at room temperature in a closed flask, the solution was evaporated in a high vacuum at a temperature below 30° C. The syrupy residue was digested 5 times with absolute ether, dissolved in water and washed twice with ether, adjusted to pH 6.5 with N·NaOH and evaporated in vacuo. After drying over $P_2O_5$ in high vacuum, the oily residue was dissolved in absolute methanol. The solution was filtered and dried in vacuo. The remaining syrup crystallized when triturated several times with absolute ether. The crude product (124.5 g.=74%) which had been dried over $P_2O_5$ in a high vacuum was dissolved in absolute methanol, filtered, precipitated with absolute ether, and again triturated several times with absolute ether. Yield: 108.3 g. (65% of the theory). The substance decomposed at temperatures in the range of from 145–160° C.

$C_{12}H_{23}N_3O_5S \cdot 1\frac{1}{2} H_2O$ (molecular weight 348.43).— Calculated (percent): C, 41.36; H, 7.52; N, 12.06; S, 9.20. Found (percent): C, 41.5; H, 7.1; N, 12.1; S, 9.2.

(d) NPS-Cys(Boc-Mac)-OH·DCHA 30.64 g. (88 mmols) of H-Cys-(Boc-Mac)-OH·1½ $H_2O$ were suspended in 140 cc. of dioxane, and 20.8 g. of 2-nitrophenyl-sulfenylchloride and 2 N·NaOH were added simultaneously in small portions in quantities as to maintain the pH value constantly at 7–7.5. After stirring for 30 minutes and diluting with 1 l. of water, the solution was suction-filtered and the filtrate was adjusted to pH 2–3 with 1 N·$H_2SO_4$. The product which had precipitated was taken up in ethyl acetate. The solution was washed with water and dried over sodium sulfate. The salt precipitated upon addition of 25 cc. of dicyclohexylamine. This salt was filtered off with suction and dried over $P_2O_5$ in vacuo. Yield: 42.16 g. (73% of the theory): melting point 150–151° C. (decomposition).

$C_{30}H_{49}N_5O_7S_2$ (molecular weight 655.9).—Calculated (percent): C, 54.94; H, 7.53; N, 10.68; S, 9.78. Found (percent): C, 54.6; H, 7.4; N, 10.4; S, 10.1.

(e) NPS-Cys(Boc-Mac)-Gly-ONb 6.56 g. (10 mmols) of NPS-Cys(Boc-Mac)-OH·DCHA were suspended in 75 cc. of dimethylformamide, 0.96 cc. of chloroformic acid ethyl ester were added dropwise at —15° C., while thoroughly stirring, and stirring was continued for 20 minutes. 2.91 g. (10 mmols) of H-Gly-ONb·HBr in one portion and then 1.38 cc. of triethylamine in 8 cc. of dimethylformamide were added and the whole was stirred for 4 hours at room temperature. The mixture was diluted with water, then the product that had precipitated was extracted by shaking with 3 portions of ethyl acetate and the solution was washed with water, 0.2 N. $H_2SO_4$ and a solution of $NaHCO_3$, dried over $Na_2SO_4$ and evaporated in vacuo. The residue was digested with absolute ether and dried in a high vacuum. Yield: 5.62 g. (84% of the theory) of lacquer.

$C_{27}H_{34}N_6O_{10}S_2$ (molecular weight 666.75).—Calculated (percent): C, 48.63; H, 5.14; N, 12.61; S, 9.62. Found (percent): C, 48.8; H, 5.2; N, 12.8; S, 9.7.

(f) H-Cys(Boc-Mac)-Gly-ONb·HCl 1.80 g. (2.7 mmols) of NPS-Cys(Boc-Mac)-Gly-ONb were dissolved in 30 cc. of absolute methanol and 0.54 cc. (3.07 mmols) of 5.68 N. methanolic HCl were added. After standing for 15 minutes at room temperature, the mixture was poured into absolute ether and the hydrochloride was allowed to crystallize at 0° C. The crude product (1.15 g.=78% of the theory), having a melting point of 138–139° C. (decomposition) was boiled with little ethyl acetate. Yield: 0.89 g. (60% of the theory), melting point 148° C.

$C_{21}H_{32}N_5O_8SCl$ (molecular weight 550.1).— Calculated (percent): C, 45.86; H, 5.86; N, 12.73; S, 5.83. Found (percent): C, 45.5; H, 5.8; N, 12.5; S, 6.0.

(g) Bz-Val-Cys(Boc-Mac)-Gly-ONb

To a solution of 0.64 g. (2 mmols) of Bz-Val-OSu and 1.10 g. (2 mmols) of H-Cys(Boc-Mac)-Gly-ONb·HCl in 7 cc. of dimethylformamide there were added, at —5° C., 0.2 cc. (2 mmols) of N. methylmorpholine and the whole was left for 2 hours at room temperature. After evaporation to dryness in a high vacuum, the syrupy residue was distributed between water and ethyl acetate and the ethyl acetate phase was washed with water, a solution of citric acid and of sodium bicarbonate, dried over sodium sulfate, and evaporated in vacuo. The colorless lacquer was dried sharply in high vacuum. Yield: 1.10 g. (77% of the theory) of amorphous powder.

$C_{33}H_{44}N_6O_{10}C$ (molecular weight 716.8).—Calculated (percent): C, 55.29; H, 6.19; N, 11.7; O, 22.32. Found (percent): C, 55.0; H, 6.1; N, 11.8; O, 22.6.

(h)      Bz-Val-Cys-Gly-ONb
         |
         Bz-Val-Cys-Gly-ONb 0.87 g. (1.2 mmols) of Bz-Val-Cys(Boc-Mac)-Gly-ONb were allowed to react for 30 minutes at room temperature with 10 cc. of HCl/ethyl acetate. After addition of 100 cc. of absolute ether, triturating and standing for several hours, the ether was decanted and the mixture was treated again three times with absolute ether. The hydrochloride, which was then dried over $P_2O_5$ and KOH in high vacuum, was dissolved in 10 cc. of dimethylacetamide, 0.4 cc. of triethylamine were added and the whole was heated to 50° C. for 3 hours in a closed flask. After cooling to room temperature, 4 cc. of glacial acetic acid were added, the solution was titrated with 0.1 N. iodine solution, and 100 cc. of water were added subsequently. The suspension formed was left for several hours at room temperature in an open flask. The cystine-containing peptide was then filtered off by suction, washed with water and dried over $P_2O_5$ in high vacuum. Yield: 0.49 g. (79% of the theory), melting point 185–188° C. After boiling with methanol and sharp drying, the product melts at 215–218° C.: yield: 0.40 g. (65% of the theory).

$C_{48}H_{54}N_8O_{14}S_2$ (molecular weight 1031.15).—Calculated (percent): C, 55.91; H, 5.28; N, 10.87; S, 6.22. Found (percent): C, 55.6; H, 5.3; N, 10.9; S, 6.3.

EXAMPLE 4

(a) N-1-adamantyloxycarbonyl-N-methyl-β-alanine

To a solution of 8.24 g. (80 mmols) of N-methyl-β-alanine in 80 cc. of 1 N. NaOH, there were added simultaneously, at 4° C. in 30 minutes, with vibration, a solution of 34.4 g. (160 mmols) of adamantyloxycarbonyl chloride in 40 cc. of dioxane, and dropwise 88 cc. of 1 N. NaOH. Vibration was continued for 3½ hours at 4° C., then the aqueous phase was washed three times with ether, and adjusted, while cooling, to pH 2–3 with dilute citric acid. The separated oil was taken up in ether, washed twice with water, dried over sodium sulfate and evaporated in vacuo. Yield 1: 9.51 g. The ethereal solution obtained upon washing of the aqueous phase was extracted by shaking with a solution of sodium bicarbonate. The extract was acidified with dilute citric acid, the oil was taken up in ether and the ethereal solution was washed with water, dried over sodium sulfate and evaporated in vacuo. Yield 2: 10.68 g. Total yield: 20.19 g. (90%) melting point 103.5–105° C.

$C_{15}H_{23}NO_4$ (molecular weight 281.4).—Calculated (percent): C, 64.04; H, 8.24; N, 4.98. Found (percent): C, 64.4; H, 8.3; N, 4.8.

(b) β-(N-1-adamantyloxycarbonyl-N-methyl)-aminoethyl isocyanate 11.3 g. (40 mmols) of N-1-adamantyloxycarbonyl-N-methyl-β-alanine were dissolved in 120 cc. of acetone and first 6.35 cc. (46 mmols) of triethylamine in 15 cc. of acetone and subsequently 4.77 cc. (50 mmols) of chloroformic acid ethyl ester in 15 cc. of acetone were added dropwise, at 0° C. The mixture was stirred for 30 minutes at −5° C. After dropwise addition of a solution of 3.71 g. of sodium azide in 11 cc. of water, stirring was continued for 1 hour at −5° C. The mixture was then poured into 150 cc. of ice water, extracted three times with a total of 400 cc. of ice cold toluene, and the toluene solution was dried first, while cooling, over magnesium sulfate and then over phosphorus pentoxide. The filtered solution was dropped into a flask which was provided with a reflux condenser and had been heated on an oil bath to 90–100° C. Heating was continued for 1 hour and the solvent was finally distilled off in vacuo. The oil obtained was dried over phosphorus pentoxide in high vacuum. Yield: 8.55 g. (77%). In the infra-red spectrum, the product showed the characteristic isocyanate band at 2260 cm.$^{-1}$.

$C_{15}H_{22}N_2O_3$ (molecular weight 278.4).—Calculated (percent): C, 64.72; H, 7.97; N, 10.07. Found (percent): C, 64.7; H, 8.1; N, 9.9.

(c) H-Cys(Adoc-Mac)-OH 6.0 g. (38 mmols( of H-Cys-OH·HCl were dissolved in 60 cc. of dimethylformamide and combined, at 0° C., with 11.9 g. (42.8 mmols) of β-(N-1-adamantyloxycarbonyl-N-methyl)-amino-ethylisocyanate. After standing for 50 hours at room temperature, the solution was evaporated in a high vacuum and the syrupy residue was digested several times with absolute ether and dissolved in water. The solution was washed twice with ether, adjusted to pH 6.5 with 1 N NaOH and the mixture was evaporated in vacuo. The oily residue was dissolved in absolute methanol after having been dried over phosphorus pentoxide in high vacuum. The solution was filtered and dried in vacuo. The product was dried over phosphorus pentoxide in a high vacuum. Yield: 15.11 g. (almost quantitative); melting point 155–157° C. (decomposition). The substance was chromatographically uniform; $R_F$=0.16 in chloroform/methanol 8:3, thin layer plate silica gel F (Merck).

(d) Nps-Cys(Adoc-Mac)-OH·DCHA 6.0 g. (15 mmols) of H-Cys(Adoc-Mac)-OH were suspended in 25 cc. of dioxane. 3.12 g. (16.5 mmols) of 2-nitrophenylsulfenyl-chloride and a total of 16 cc. of 2 N NaOH were added simultaneously in small portions at pH 7.5, within 45 minutes. After stirring for 1 hour and diluting with 200 cc. of water, the mixture was suction-filtered, acidified with 1 N sulfuric acid to pH 2–3, washed with water until neutrality and dissolved in ethyl acetate. The ethyl acetate solution, which was then dried over sodium sulfate, was combined with 4 cc. of dicyclohexylamine and the salt was suction-filtered after standing for 12 hours at 0° C., and dried over phosphorus pentoxide in high vacuum. Yield: 6.81 g. (62%); melting point 148–149° C. (decomposition).

$C_{36}H_{55}N_5O_7S_2$ (molecular weight 734.0).—Calculated (percent): C, 58.91; H, 7.55; N, 9.54; S, 8.74. Found (percent): C, 58.7; H, 7.6; N, 9.4; S, 9.0.

(e) Nps-Cys(Adoc-Mac)-Gly-ONb 0.60 cc. (6.3 mmols) of chloroformic acid ethyl ester was added dropwise, at −15° C., while vigorously stirring, to a suspension of 4.61 g. (6.3 mmols) of Nps-Cys(Adoc-Mac)-OH·DCHA in 50 cc. of dimethylformamide. After stirring for 20 minutes, 1.84 g. (6.3 mmols) of H-Gly-ONb·HBr were added. Then 0.88 cc. (6.3 mmols) of triethylamine in 5 cc. of dimethylformamide was added dropwise and the whole was stirred for 3 hours at room temperature. After diluting with water, the mixture was extracted three times with ethyl acetate and the ethyl aceate solution was washed with 0.2 N $H_2SO_4$, sodium bicarbonate solution and water, dried over sodium sulfate and evaporated in vacuo. The residue was triturated with petroleum ether, suction-filtered and dried over phosphorus pentoxide in high vacuum. Yield: 3.98 g. (85%); melting point 109–110° C.

$C_{33}H_{40}N_6O_{10}S_2$ (molecular weight 744.9).—Calculated (percent): N, 11.29; S, 8.62. Found (percent): N, 11.1; S, 8.8.

(f) H-Cys(Adoc-Mac)-Gly-ONb·HCl 1.16 g. (1.56 mmols) of Nps-Cys(Adoc-Mac)-Gly-ONb were dissolved in 40 cc. of distilled ethyl acetate, combined with 1.18 cc. of 2.8 N methanolic HCl (3.28 mmols) and after 3 minutes, 200 cc. of absolute ether were added. The hydrochloride was filtered off with suction, washed with absolute ether and dried over KOH and $P_2O_5$ in high vacuum. Yield: 0.66 g. (67%) melting point 120–140° C. (decomposition). The product was chromatographically pure. $R_F$=0.72 in chloroform/methanol in the proportion of 8:3, thin layer plate silica gel F (Merck).

(g) Bz-Val-Cys(Adoc-Mac)-Gly-ONb 0.57 g. (0.90 mmols) of H-Cys(Adoc-Mac-Gly-ONb·HCl and 0.29 g. (0.90 mmols) of Bz-Val-OSu were dissolved in 5 cc. of dimethylformamide. 0.13 g. of triethylamine was added at 0° C. After standing for 2 hours, the whole was evaporated in high vacuum. The residue was distributed between water and ethyl acetate and the ethyl acetate solution was washed with 0.5 N HCl, sodium bicarbonate solution and diluted sodium chloride solution, dried over sodium sulfate and evaporated in vacuo. The residue was triturated with ether/petroleum ether, filtered off with suction and dried over $P_2O_5$ in high vacuum. Yield: 0.49 g. (68%) melting point 83° C. (decomposition) $[\alpha]_D^{22}$: −31.8° (c.=1 in glacial acetic acid).

$C_{39}H_{50}N_6O_{10}S$ (molecular weight 794.9).—Calculated (percent): N, 10.57; S, 4.03. Found (percent): N, 10.3; S, 4.3.

(h)         Bz-Val-Cys-Gly-ONb
               |
        Bz-Val-Cys-Gly-ONb 0.30 g. (0.38 mmols) of Bz-Val-Cys(Adoc-Mac)-Gly-ONb were dissolved in 2 cc. of trifluoroacetic acid. After standing for 1 hour at room temperature, 100 cc. of absolute ether were added, the whole was triturated and, after decanting, treated twice with 50 cc. of absolute ether each time. The ether was decanted and the trifluoroacetate was dried over KOH and $P_2O_5$ in high vacuum. Yield: 0.24 g. The dried trifluoroacetate was dissolved in 4 cc. of dimethylacetamide, 0.14 cc. of triethylamine was added and the mixture was heated to 50° C. for 3 hours in a closed flask. After cooling to room temperature, 2 cc. of glacial acetic acid were added, the mixture was titrated with 0.1 N iodine solution (0.2 cc. was used) and combined with 30 cc. of water. The suspension formed was left for several hours at hoom temperature in an open flask. The cystine containing peptide was filtered off with suction, washed with water and dried over phosphorous pentoxide in high vacuum. Yield: 0.15 g. (77%) melting point 187–191° C. After boiling with little methanol and sharp drying, the product melts at 214–217° C. Yield: 0.12 g. (61%).

$C_{48}H_{54}N_8O_{14}S_2$ (molecular weight 1031.15).— Calculated (percent): C, 55.91; H, 5.27; S, 6.20. Found (percent): C, 55.6; H, 5.5; S, 6.4.

We claim:

1. In a process for the synthesis of peptides built up from α-amino acids wherein an N-protected-S-protected-cysteine is reacted with a carboxyl protected α-amino acid or peptide built up from α-amino acids and having a free N-terminal amino group, wherein all functional groups requiring protection are protected, the improvement wherein the sulfhydryl group of cysteine is protected by an S-[β-(N-lower alkyl-N-Y)-aminoethylcarbamoyl] group wherein lower alkyl is methyl or ethyl and Y is benzyloxycarbonyl, t-butyloxycarbonyl, or adamantyloxycarbonyl.

2. In a process for the synthesis of peptides built up from α-amino acids wherein a peptide having an N-unprotected-S-protected-cysteine residue in its N-terminal position and all of its carboxyl groups protected is reacted with an N-protected-α-amino acid or peptide built up from α-amino acids, wherein all functional groups requiring protection are protected, the improvement wherein the sulfhydryl group of cysteine is protected by an S-[β-(N-lower alkyl-N-Y)-aminoethylcarbamoyl] group wherein lower alkyl is methyl or ethyl and Y is benzyloxycarbonyl, t-butyloxycarbonyl, or adamantyloxycarbonyl.

References Cited

UNITED STATES PATENTS

| | | | |
|---|---|---|---|
| 2,615,025 | 10/1952 | Lutz | 260—309.7 |
| 2,767,143 | 10/1956 | Caffrey | 252—42.7 |
| 3,325,466 | 6/1967 | Anderson et al. | 260—112.5 |
| 3,560,521 | 2/1971 | Milkowski et al. | 260—326.3 |

OTHER REFERENCES

Hofmann: Imidazole and Its Derivatives, The Chemistry of Heterocyclic Compounds, Weissberger, ed., Interscience Publishers, New York (1953). pp. 226–229.

Schroder et al.: The Peptides, vol I, Academic Press, New York (1966), pp. 72–73.

Cuttmann et al.: Helv. Chim. Acta., 49, 83–88 (1966).

Lindley: Australian J. Chem. 12, 196–8 (1959).

LEWIS GOTTS, Primary Examiner

U.S. Cl. X.R.

260—309.7, 326.3, 453, 455 A, 463, 482 C, 534 C